(12) United States Patent
Jones

(10) Patent No.: US 9,827,905 B1
(45) Date of Patent: Nov. 28, 2017

(54) REAL-TIME TRAFFIC MONITORING SYSTEMS AND METHODS

(71) Applicant: Tiffany Nicole Jones, Jonesboro, GA (US)

(72) Inventor: Tiffany Nicole Jones, Jonesboro, GA (US)

( * ) Notice: Subject to any disclaimer, the term of this patent is extended or adjusted under 35 U.S.C. 154(b) by 255 days.

(21) Appl. No.: 14/714,947

(22) Filed: May 18, 2015

Related U.S. Application Data

(60) Provisional application No. 62/178,208, filed on Feb. 5, 2015.

(51) Int. Cl.
*B60Q 9/00* (2006.01)
*G01S 13/02* (2006.01)
*G01S 19/13* (2010.01)

(52) U.S. Cl.
CPC .............. *B60Q 9/008* (2013.01); *G01S 13/02* (2013.01); *G01S 19/13* (2013.01)

(58) Field of Classification Search
CPC .. B60Q 9/008; B60Q 9/006; G08G 1/096716; G01S 13/34
USPC ............. 701/30, 45, 117; 340/435–436, 903; 342/70, 92, 196
See application file for complete search history.

(56) References Cited

U.S. PATENT DOCUMENTS

| | | | | |
|---|---|---|---|---|
| 7,489,236 B2 * | 2/2009 | Chavarria | ................ | B60Q 1/50 340/468 |
| 7,557,907 B2 | 7/2009 | Matsuo et al. | | |
| 8,072,370 B2 * | 12/2011 | Woodington | ........... | G01S 13/34 340/435 |
| 8,103,412 B2 * | 1/2012 | Miller | .................... | B60Q 9/008 701/301 |
| 8,195,394 B1 | 6/2012 | Zhu et al. | | |
| 8,362,889 B2 * | 1/2013 | Komori | ............ | G08G 1/096716 340/435 |
| 2005/0073433 A1 * | 4/2005 | Gunderson | ............ | B60Q 9/006 340/903 |
| 2013/0282277 A1 * | 10/2013 | Rubin | ....................... | G08G 9/02 701/517 |
| 2015/0339925 A1 * | 11/2015 | Hillenbrand | ........... | G08G 1/166 340/901 |

OTHER PUBLICATIONS

B. Howard, "What is adaptive cruise control, and how does it work?," www.extremetech.com, Jun. 4, 2013.

(Continued)

*Primary Examiner* — Albert Wong

(57) ABSTRACT

Various embodiments of the invention provide methods, systems, and computer program products for monitoring a landscape surrounding an object such as a vehicle and signaling neighboring objects, such as other vehicles or pedestrians, as to whether it is safe or not to move around the object. Specifically, a portion of landscape surrounding an object is monitored using a network of object recognition devices that are capable of recognizing objects against the portion of landscape. A first object is detected by one of the devices and a determination is made as to whether the first object is at a distance to allow a second object to move safely around the object and avoid the first object. Upon determining the first object is not at such a distance, a message is displayed that can be viewed by the second object conveying to the second object not to move around the object.

20 Claims, 16 Drawing Sheets

(56) References Cited

OTHER PUBLICATIONS

B. Howard, "Blind spot detection: Car tech that watches where you can't," www.extremetech.com, Sep. 5, 2013.
"Accident Avoidance and Driver Assist Technologies," Ford Sustainability Report 2013/14.
R. Whitwam, "How Google's self-driving cars detect and avoid obstacles," www.extremetech.com, Sep. 8, 2014.
D. Newcomb, "Stereo Cameras Spot Pedestrians, Stop Your Car," www.wired.com, Nov. 6, 2012.
J. Carter, K. Schmid, K. Waters, L. Betzhold, B. Hadley, R. Mataosky, and J. Halleran, "LIDAR 101: An Introduction to Lidar Technology, Data, and Applications," National Oceanic and Atmospheric Administration (NOAA) Coastal Services Center, Nov. 2012.
J. Jendzurski and N. Paulter, "Calibration of Speed Enforcement Down-The-Road Radars," Journal of Research of the National Institute of Standards and Technology, vol. 114, No. 3, pp. 137-148, May Jun. 2009.
H. Bay, A. Ess, T. Tuytelaars, and L. Van Gool, "Speed-Up Robust Features (SURF)," Sep. 10, 2008.
H. Gonzalez, E. Grotli, T. Templeton, J. Biermeyer, J. Sprinkle, and S. Sastry, "Transitioning Control and Sensing Technologies from Fully-autonomous Driving to Driver Assistance Systems," In Proceedings of the Symposium on Automation, Assistance, and Embedded Real Time Platforms for Transportation 2007 (AAET07), Braunschweig, Germany, 2007.

\* cited by examiner

REAL-TIME TRAFFIC MONITORING SYSTEMS AND METHODS

CROSS REFERENCE TO RELATED APPLICATIONS

This application claims priority to U.S. Provisional Patent Application 62/178,208, entitled Mobile Traffic Management System and filed on Feb. 5, 2015, the entire contents of which are incorporated by reference for all that they teach.

BACKGROUND OF THE INVENTION

A problem often encountered on today's roadways are vehicles that may hinder and/or impede traffic because of the size of the vehicles, the speed at which the vehicles can travel, and/or the use of the vehicles that may cause them to make frequent stops. For instance, a school bus full of children may make frequent stops along a bus route and may generally travel at a reduced speed for safety reasons. While in other instances, delivery trucks may be large in comparison with other vehicles on a city street and may also make frequent stops for deliveries. As a result, many drivers of other vehicles following a school bus or delivery truck may become frustrated and impatient while forced to travel slowly behind such a vehicle and/or forced to make frequent stops. Such frustration can lead to these drivers attempting to dangerously pass such vehicles when they cannot clearly see around these vehicles for approaching traffic or other objects in the roadway such as pedestrians crossing the street.

The same can be said for pedestrians who may be attempting to cross the street in front or behind a parked vehicle such as a delivery truck. They may have trouble determining whether there is any approaching traffic that may make crossing the street dangerous. Thus, a need in the art exists for improved processes and systems for monitoring the landscape around such vehicles and providing neighboring vehicles and pedestrians with information that may aid them in navigating safely around such vehicles. It is with respect to these considerations and others that the disclosure herein is presented.

SUMMARY OF THE INVENTION

Technologies are generally presented herein pertaining to systems, methods, and non-transitory computer-readable media for monitoring a landscape surrounding a first object such as a vehicle or in a designated area and signaling neighboring objects, such as neighboring vehicles and/or pedestrians, as to whether it is safe or not to move around the first object or through the designated area. For instance, in various embodiments, at least a portion of a landscape surrounding a first object or in a designated area is monitored using one or more object recognition devices that are capable in recognizing objects against the portion of landscape. Generally speaking, these object recognition devices may be, for example, a camera, a radar detection device, a spectrometer, a heat detection device, a GPS device, and/or some other device that may use remote sensing such as a satellite.

Accordingly, a second object is detected within the landscape by at least one of the object recognition devices and a determination is made as to whether the second object is at a distance to allow a third object to move around the first object or through the designated area and avoid the second object. For instance, the second object may be a vehicle approaching the first object in an opposite direction and the third object may be a second vehicle attempting to pass the first object in a lane being used by the second object. While in another instance, the second object may be a vehicle and the third object may be a pedestrian attempting to walk in front of the first object in a crosswalk.

Upon determining the second object is not at a distance to allow the third object to move around the first object or through the designated area and avoid the second object, a message is displayed in various embodiments that can be viewed by the third object conveying to the third object not to move around the first object or through the designated area. For instance, in particular embodiments, the message may be displayed on a display unit attached to the exterior or interior of the first object. Further, in particular embodiments, upon determining the second object is at a distance to allow the third object to move around the first object or through the designated area and avoid the second object, a message is displayed that can be viewed by the third object conveying to the third object that the third object is safe to move around the first object or through the designated area.

The subject matter disclosed herein may be implemented as a computer-controlled apparatus, a method, a computing system, or as an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION OF THE INVENTION

Figure 1:
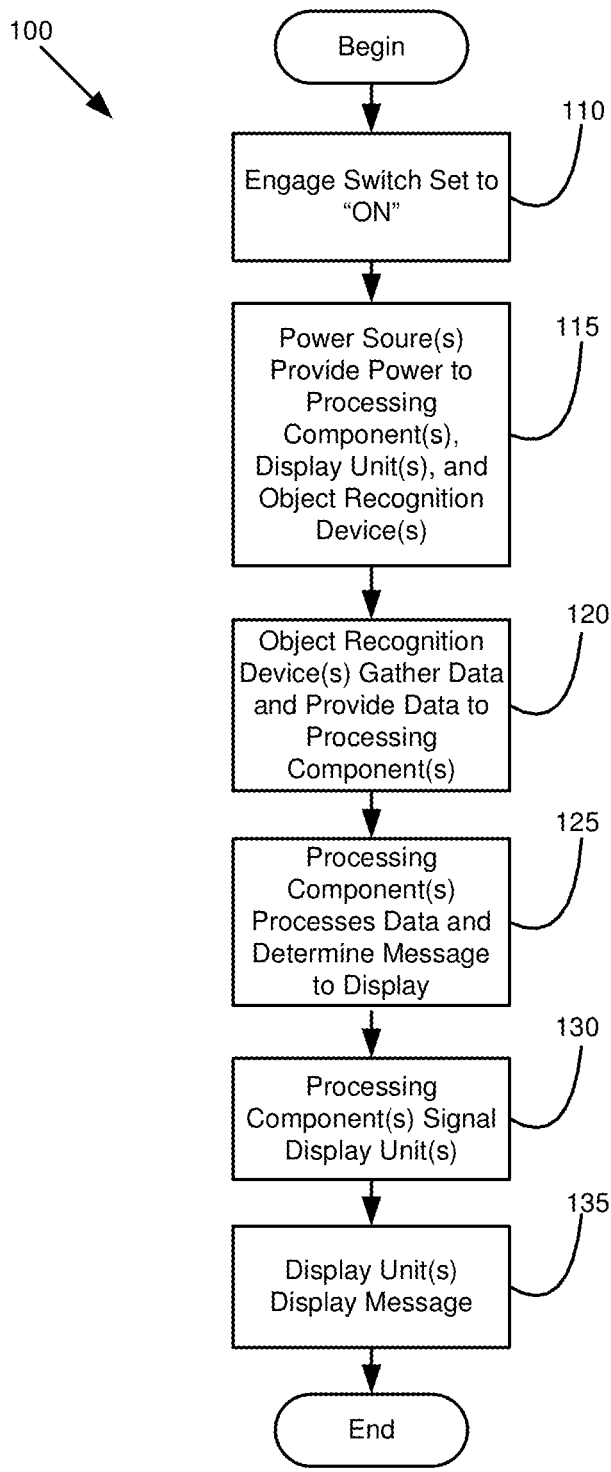
FIG. 1 illustrates a general process for practicing various embodiments of the invention.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. As will be evident, there are a number of variations on the embodiments disclosed herein, but which are based on similar concepts and goals. Like numbers in the drawings refer to like elements throughout.

General Overview of the Invention

Various embodiments of the invention involve the use of object recognition technologies in conjunction with one or more display units on a vehicle that may hinder/impede traffic (e.g., that may travel at reduced speeds and/or may make frequent stops). Accordingly, messages can be provided on one or more display units to neighboring vehicles with respect to objects detected in at least a portion of the landscape surrounding the vehicle and whether or not the neighboring vehicles can safely pass the vehicle. For instance, an embodiment of the invention may be installed on a delivery truck so that vehicles following the truck and/or sitting behind the truck during one of the truck's stops can be alerted as to whether it is safe or not to drive around and pass the truck based on objects (e.g., other vehicles or pedestrians) detected in the landscape surrounding the truck. For example, neighboring vehicles following and/or sitting behind the delivery truck can be alerted as to whether or not any oncoming traffic is approaching in the opposite direction that would make it unsafe for those vehicles to pull around in the lane used by oncoming traffic to drive around and pass the delivery truck.

Broadly speaking, various embodiments of the present invention involve the use of components comprising an engage switch, one or more processing components, one or more power sources, a network of one or more display units, and a network of one or more object recognition devices. Accordingly, FIG. 1 illustrates a general process flow 100 for practicing various embodiments of the invention and begins with the engage switch being set to an "ON" position in Step 110. As a result, the one or more power sources provide power to the one or more processing components, the network of display units, and the network of object recognition devices in Step 115. In general, the object recognition devices may be any device that has the capability to recognize objects against a given landscape. For instance, such devices may include cameras, radar detection devices, spectrometers, devices based on heat-seeking technology, GPS devices, and other devices that may use remote sensing such as a satellite. Once powered, the network of object recognition devices mounted to the exterior of a vehicle gather data on objects detected in the landscape surrounding the vehicle and provide this data to the one or more processing components in Step 120. In turn, the processing components process the data and determine a message to display on the network of display units mounted to the exterior of the vehicle in Step 125 based on the objects detected in the landscape surrounding the vehicle. Accordingly, the processing components send a signal to the display units in Step 130 and as a result, the display units display the message in Step 135 so that drivers of neighboring vehicles may then read the message to determine whether or not it is safe to drive around and pass the vehicle. Thus, implementation of various embodiments of the present invention can enable neighboring vehicles to safely pass a vehicle that may be hindering/impeding traffic and can further lead to a decrease in accidents, roadway fatalities, insurance claims, road rage, and/or driver-related stress as well as an increase to work-related productivity with respect workers who operate around vehicles such as sanitation workers and/or emergency response to workers in that these workers are able to focus more on their work and less on traffic safety.

Component Configurations

As briefly mentioned above, a network of one or more object recognition devices is mounted to the exterior of the vehicle in various embodiments to detect objects in the landscape surrounding the vehicle and to send data on these detected objects to one or more processing components for processing. Depending on the embodiment, the object recognition devices may be configured to send data to the one or more processing components based on different criteria. For instance, in particular embodiments, the object recognition devices may be configured to simply gather data on the landscape surrounding the vehicle and send the data to the processing components at different time intervals such as, for example, every second, five seconds, or ten seconds. While in other embodiments, the object recognition devices may be configured to send the data to the processing components upon detecting an object moving into the landscape surrounding the vehicle. Such a configuration can be further refined so that the object recognition devices only send the data upon detecting the object is actually moving through the landscape instead of being a stationary object that has moved into view of the landscape surrounding the vehicle due to the vehicle's travel. Those of ordinary skill in the art can envision other configurations that can be employed by the object recognition devices with respect to sending the data to the processing components in light of this disclosure.

Figure 2:
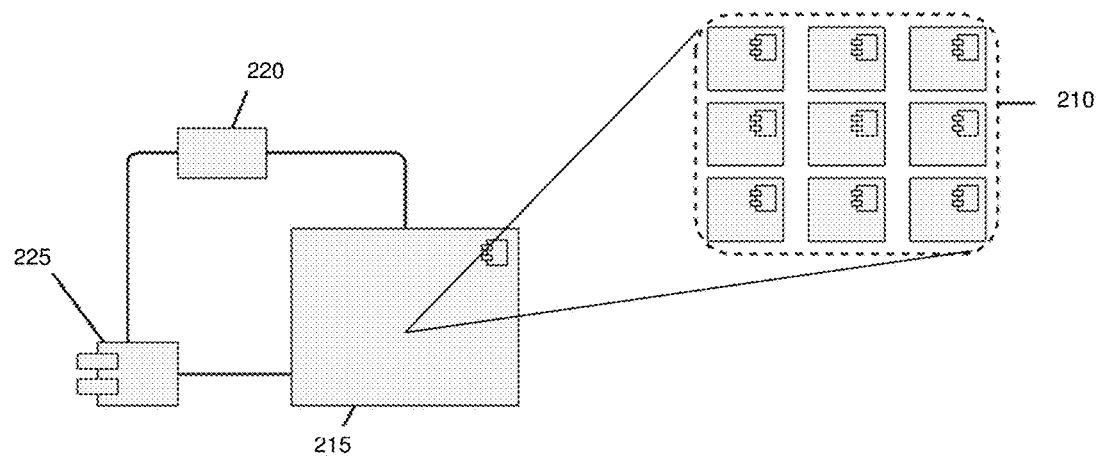
FIG. 2 illustrates a collect of object recognition devices according to various embodiments of the present invention.
Figure 3:
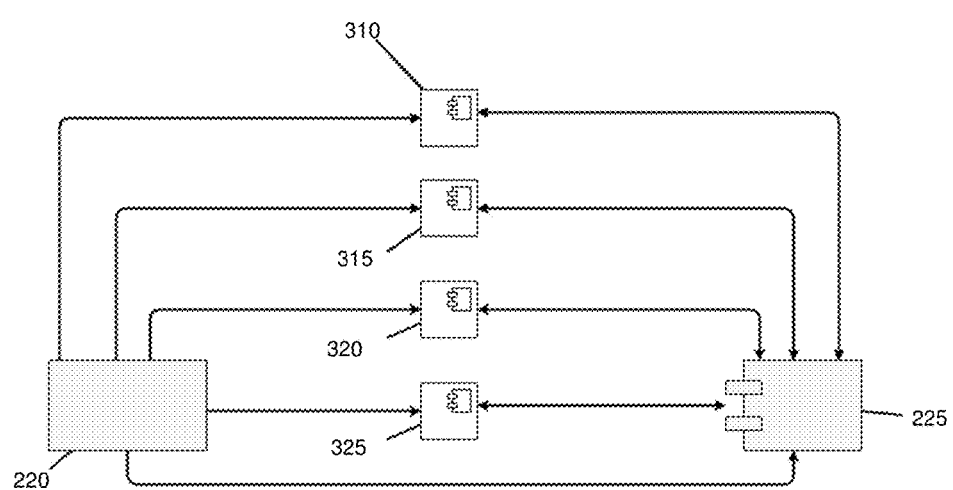
FIG. 3 illustrates a network of object recognition devices according to various embodiments of the present invention.

Accordingly, FIG. 2 illustrates a collection of object recognition devices 210 that make up an object recognition network 215 in relation to one or more power sources 220 and one or more processing components 225. In this configuration, each object recognition device 210 has the ability to recognize objects against a given landscape and may operate independently within the network 215 or in conjunction with other devices 210 within the network 215. For instance, each object recognition device 210 may be a radar device, a camera with or without night vision, a heat detection device, a GPS device, or some other device that may use remote sensing such as a satellite. Further, each object recognition device 210 is powered by one or more power sources 220 and communicates with one or more processing components 225 that analyze data received from the object recognition device 210. For example, in particular embodiments, the network may comprise individual object recognition devices 310, 315, 320, 325 arranged in a parallel configuration as shown in FIG. 3 that is powered by the one or more power sources 220 and communications with the one or more processing components 225 accordingly. While in other embodiments, the network may comprise individual object recognition devices and each device may be configured to include its own power source and processing component.

Figure 4:
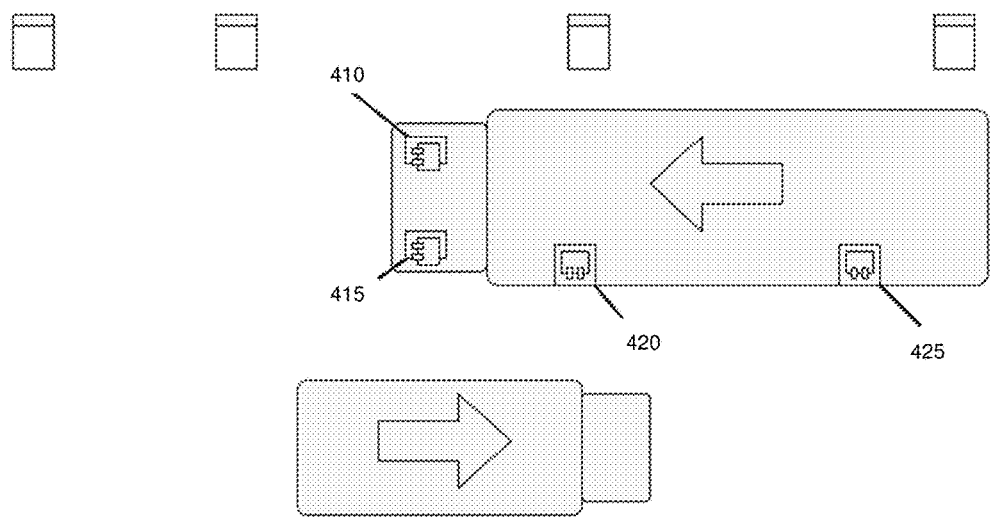
FIG. 4 illustrates a top view of mounted object recognition devices according to various embodiments of the present invention.

With that said, an embodiment of a network of object recognition devices is shown in FIG. 4 involving several object recognition devices 410, 415, 420, 425 mounted at different positions on the exterior of a vehicle (e.g., a delivery truck). Specifically, two object recognition devices 410, 415 are mounted to the top, front exterior of the vehicle and two object recognition devices 420, 425 are mounted to the top, left side exterior of the vehicle. The two object recognition devices 410, 415 mounted to the top, front exterior of the vehicle are directed away from the front end of the vehicle so that these devices 410, 415 can gather data (e.g., information) about the landscape in front of the vehicle while the two object recognition devices 420, 425 mounted to the top, left side exterior of the vehicle are directed away from the left side of the vehicle so that these devices 410, 415 can gather data about the landscape along the left side of the vehicle. Thus, data about the surrounding landscape with respect to the front and left side of the vehicle can be gathered and relayed to the one or more processing components using this configuration of the object recognition devices 410, 415, 420, 425. (It is noted that the network of object recognition devices in various embodiments may include other configurations of object recognition devices such as, for example, devices may also be mounted to the top, right side exterior and/or top, back exterior of the vehicle based on design preferences. Further, in particular embodiments, the devices may be mounted in the interior of the vehicle so that they are able to monitor through a transparent surface such as the front windshield, side windows, and/or rear window of the vehicle. Thus, it should be understood that the configuration of the network of object recognition devices shown in FIG. 4 is not the only configuration that may be used in conjunction with various embodiments of the invention and should not be construed to limit the scope of the invention.)

Figure 5:
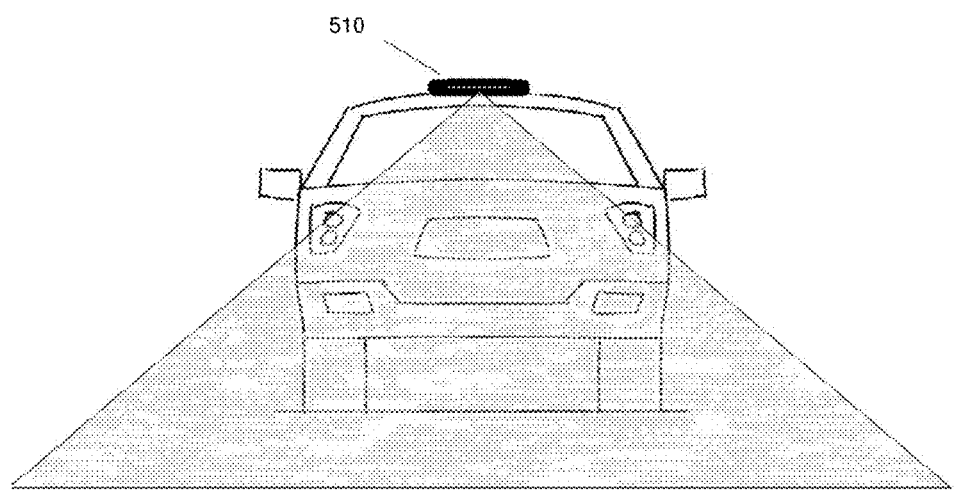
FIG. 5 illustrates a front view of a mounted object recognition device according to various embodiments of the present invention.

Turning now to FIG. 5, a configuration is shown with an object recognition device 510 mounted to the front, exterior roof of a vehicle. In this configuration, the object recognition device 510 is directed away from the front end of the vehicle so that it may gather data (e.g., information) about the landscape in front of the vehicle. For instance, in particular embodiments, the object recognition device 510 may be mounted in a position so that the device 510 can recognize objects within 0.0254 meters in front of the hood of the vehicle to ensure a maximum detection range without having any blind spots.

Figure 6:
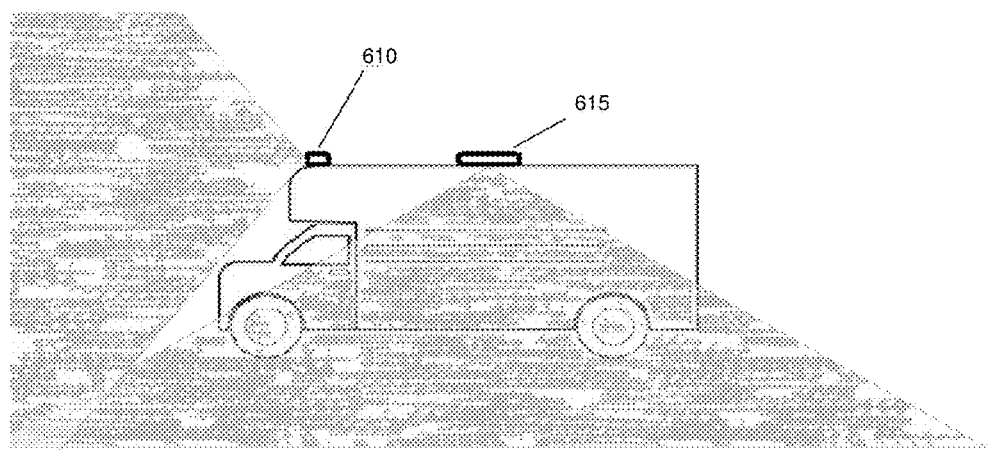
FIG. 6 illustrates a left side view of a mounted recognition device and a front view of a mounted object recognition device according to various embodiments of the present invention.

Likewise, FIG. 6 provides a configuration with an object recognition device 610 is mounted to the front, exterior roof of the vehicle and an objection recognition device 615 is mounted to the side, exterior roof of the vehicle. In this configuration, the first object recognition device 610 mounted to the front, exterior roof of the vehicle is directed away from the front of the vehicle so that the device 610 can recognize objects within 0.0254 meters in front of the hood of the vehicle while the second object recognition device 615 mounted to the side, exterior roof of the vehicle and is directed away from the left side of the vehicle so that the device 615 can recognize objects within 0.0254 meters of the left side of the vehicle. Thus, in this configuration, the detection ranges for the two devices 610, 615 overlap to ensure a maximum detection range without having any blind spots.

Accordingly, once the network of object recognition devices has gathered data about the landscape surrounding the vehicle, the network sends the data to the processing components. In turn, the processing components process the data and send signals in accordance to such data to one or more display units on the exterior and/or interior of the vehicle so that messages are displayed to drivers of neighboring vehicles providing these drivers with information on the landscape surrounding the vehicle.

Figure 7:
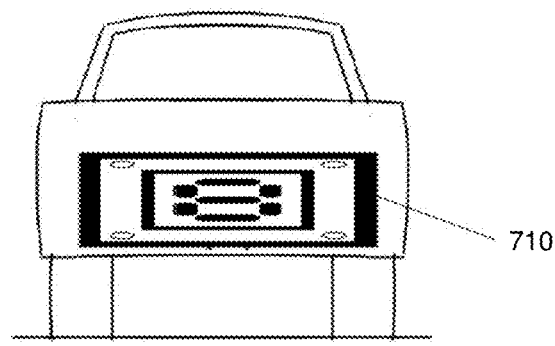
FIG. 7 illustrates a view of a display unit mounted to the exterior of a vehicle according to various embodiments of the invention.

An embodiment of such a display unit 710 is shown in FIG. 7 mounted to the exterior portion of the back of a vehicle. As will be understood by those of ordinary skill in the art, the display unit 710 is mounted to the exterior of the vehicle in various embodiments so that it is visible to drivers. For instance, in particular embodiments, the display unit 710 may be mounted to the rear trunk area of the vehicle as shown in FIG. 7 so that drivers immediately following the vehicle can view the display unit 710. However, in other embodiments, the display unit 710 may be mounted in the interior of the vehicle and viewable through a transparent surface such as the front windshield, side windows, or rear window of the vehicle. Further, depending on the embodiment, the display unit 710 may be permanently mounted to the vehicle or detachable so that is may be removed when not in use.

With that said, in particular embodiments, the display unit may be associated with a neighboring vehicle such as, for example, the interior screen used in a neighboring vehicle for displaying temperature controls, entertainment controls, GPS mapping displays, etc. In these particular embodiments, the processing components may be configured to wirelessly transmit signals to one or more neighboring vehicles so that messages are displayed on the neighboring vehicles' interior screens. Such signals may be wirelessly transmitted using Wi-Fi, cellular, or Bluetooth, for example, or some other similar technology. Thus, the drivers of neighboring vehicles can simply view the messages on their interior displays in their vehicles instead of having to view a display mounted on the vehicle from which the monitoring is occurring.

Figure 8:
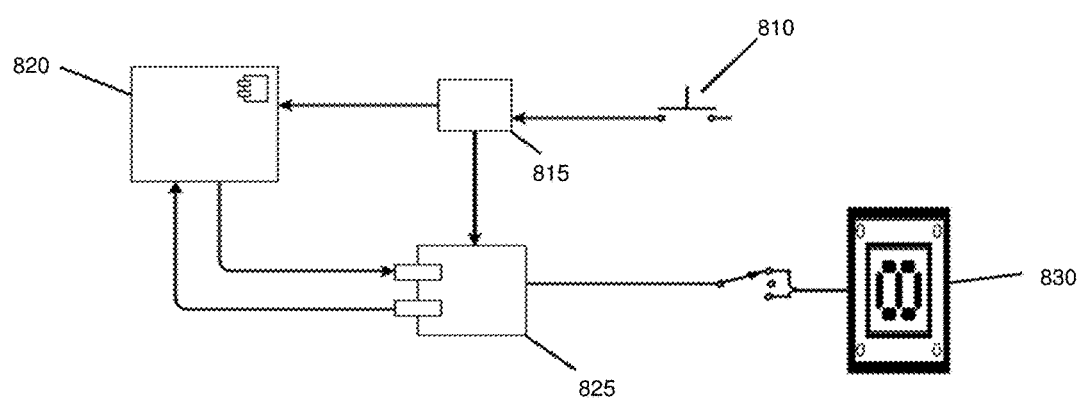
FIG. 8 illustrates a configuration of components according to various embodiments of the present invention.

Turning now to FIG. 8, a configuration installed on a vehicle according to various embodiments of the invention is shown involving an engage switch 810, a power source 815, a processing component 820, a network of object recognition devices 825, and a display unit 830. In this particular configuration, when the engage switch 810 is set to an "ON" position, the power source 815 provides power to the processing component 820, the network of object recognition devices 825, and the display unit 830. Depending on the embodiment, the engage switch 810 may be manually or automatically set to the "ON" position. For instance, in particular embodiments, the engage switch 810 may be a push-button mechanism, a push-pull lever mechanism, or a voice-activated mechanism that is manually set by a user. While in other embodiments, the engage switch 810 may be some type of mechanism that is triggered by an event such as, for example, the starting of the vehicle or the stopping of the vehicle for a set amount of time at a delivery location. Those of ordinary skill in the art can envision multiple mechanisms and processes for setting the engage switch 810 in light of this disclosure.

In turn, the processing component 820 initially signals the display unit 830 in this particular instance to display a message that it is not safe to pass the vehicle. Next, the processing component 820 engages the network of object recognition devices 825 and the devices begin to monitor the landscape surrounding the vehicle for objects (e.g., monitors the reverse lane for moving vehicles) and to send data to the processing component 820 accordingly. The processing component 820 analyzes the data received from the network of object recognition devices 825 and if the processing component 820 detects an object (e.g., a moving vehicle) that is not within an unsafe distance, then the processing component 820 signals the display unit 830 to display a message that it is safe to pass the vehicle. Otherwise, if the processing component 820 detects an object is within an unsafe distance, then the processing component 820 signals the display unit 830 to display the message that it is not safe to pass the vehicle. At this point, the network of object recognition devices 825 in this particular instance continues to monitor the landscape surrounding the vehicle (e.g., continues to monitor the reverse lane for moving vehicles) and sends data accordingly to the processing component 820 for analysis. Thus, the process continues to repeat until the engage switch 810 is set to the "OFF" position.

Figure 9:
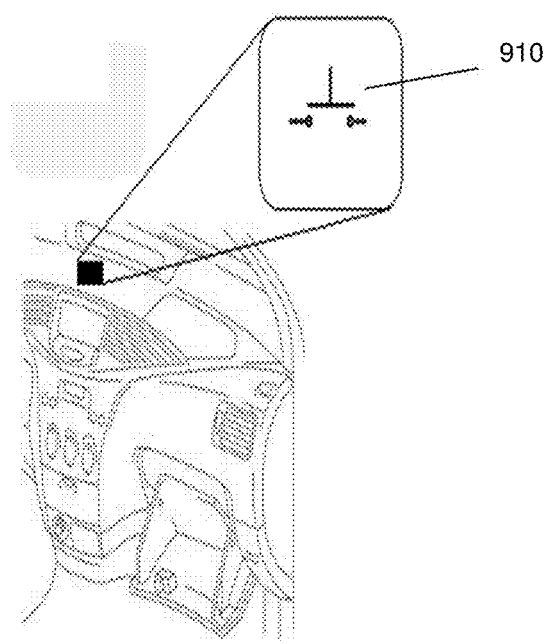
FIG. 9 illustrates a view of an engage switch according to various embodiments of the present invention.

FIG. 9 provides a view of an engage switch 910 mounted in the interior of a vehicle according to various embodiments of the invention that may be manually operated by a driver of the vehicle. For instance, the engage switch 910 may be a button that is pressed or a lever that is pulled or pushed by the driver of the vehicle. More specifically, the engage switch 910 shown in FIG. 9 is mounted on the dashboard of the vehicle so that the switch 910 can be easily reached by the driver and switched to the "ON" position to engage or to the "OFF" position to disengage.

Figure 10:
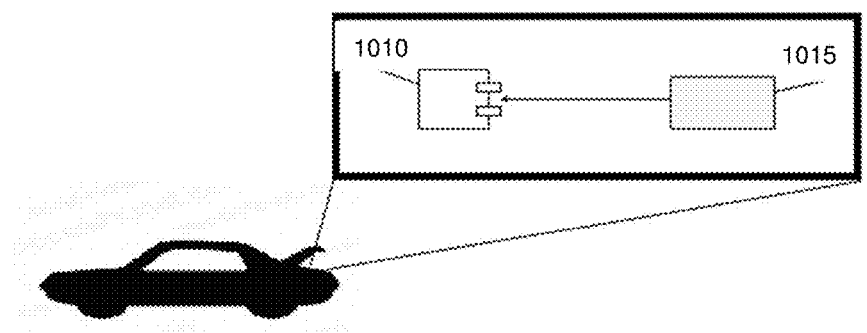
FIG. 10 illustrates a configuration of a processing component and power source mounted in the trunk of a vehicle according to various embodiments of the present invention.

Further, FIG. 10 provides a configuration of a processing component 1010 and a power source 1015 mounted in the trunk of a vehicle. However, as is understood by those of ordinary skill in the art in light of this disclosure, these components may be mounted in other locations on the vehicle. For instance, these components may be mounted under a seat located in the interior compartment of the vehicle, in a compartment such as a glove box of the vehicle, or in an enclosure mounted on the exterior of the vehicle. Thus, the processing component 1010 and power source 1015 may be located in any cavity, throughout the interior/exterior portion of a vehicle. Accordingly, depending on the embodiment, the location of these components is left to the discretion of the user of the present invention and/or the vehicle manufacturer.

Finally, it is noted that depending on the embodiment, the various components described above may be located "on-board" or locally on the vehicle or remotely from the vehicle. For instance, in particular embodiments, the processing component(s) and/or power source(s) may be located remotely from the vehicle and data and/or power may be transmitted wireless to/from these component(s) from/to other components on the vehicle. For example, the network of objection recognition devices may be configured to gather data on the landscape surrounding the vehicle and transmit the data over a wireless network or cellular network to the processing component(s). Likewise, a wireless power source may be used to transmit power to the various components on the vehicle such as the objection recognition devices and/or display units using near-field and/or far-field technologies.

Alternative Configuration

Figure 11:
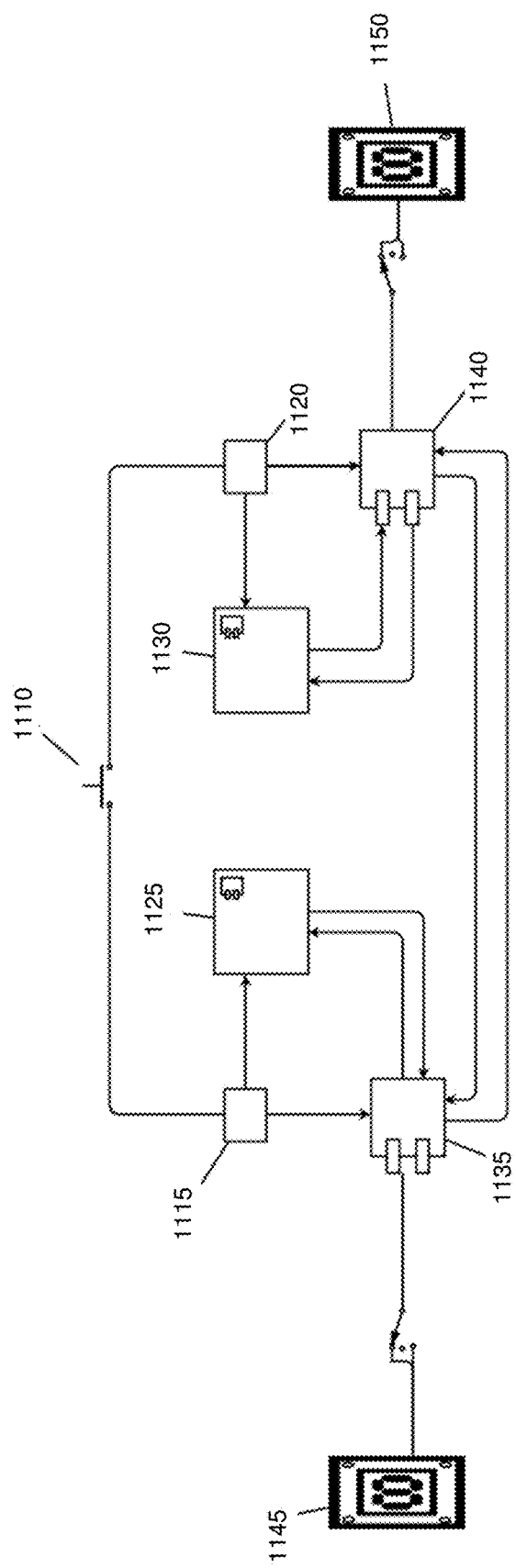
FIG. 11 illustrates a configuration of an alternative embodiment according to various embodiments of the present invention.

FIG. 11 provides an alternative configuration in which multiple monitoring components are connected either by wire or wirelessly to communicate information about positions of various objects against a landscape in real time. For instance, one particular use may be to monitor the positions of various objects that pass through a designated area between the monitoring components such as, for example, vehicles that pass through an intersection. An engage switch 1110 is set to an "ON" position and one or more power sources 1115, 1120 provide power to one or more processing components 1135, 1140, object recognition devices 1125, 1130, and display units 1145, 1150. In turn, the display units 1145, 1150 display a message to instruct objects (e.g., traffic) travelling on paths either parallel and opposite or intersecting to remain stopped while the object recognition devices 1125, 1130 monitor the designated area between the stopped objects. Accordingly, if the object recognition devices 1125, 1130 do not detect any obstruction within the designated area, then one display unit 1145 displays a message, such as "PROCEED," to signal stopped objects to proceed from one direction through the designated area. Depending on the embodiment, this message may be shown for a designated time interval, such as thirty or sixty seconds, or until the object recognition devices 1125, 1130 do not detect any objects proceeding through the designated area. At that point, the display unit 1145 displays a message, such as "STOP," to cease any additional objects from proceeding. In turn, the object recognition devices 1125, 1130 monitor the designated area and when no obstruction is detected within the designated area, the other display unit 1150 then displays a message, such as "PROCEED," to allow objects to travel from a second direction for a designated time interval or until no further objects are detected in the designated area. The configuration may continue this loop between the display units 1145, 1150 until disengaged.

Figure 12:
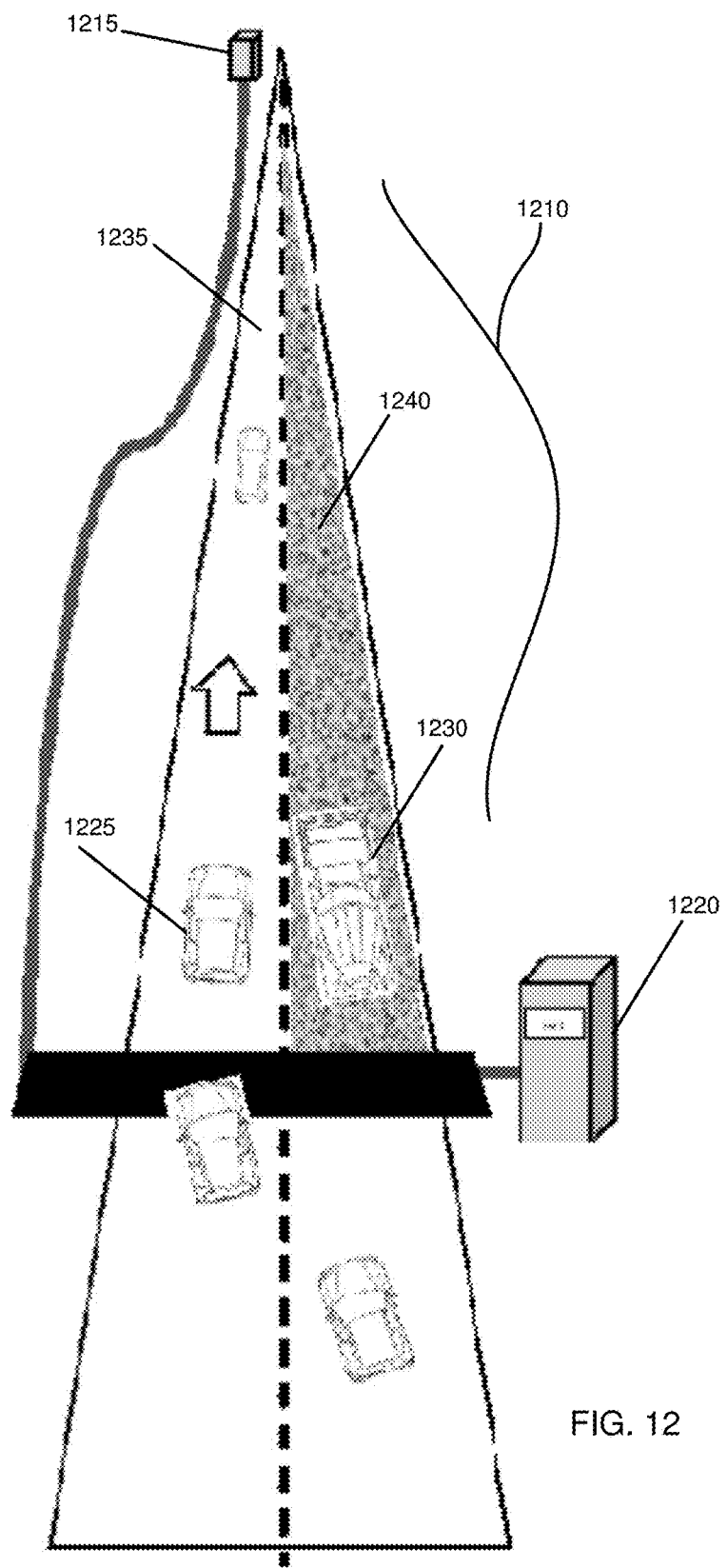
FIG. 12 illustrates a top view using a configuration of the alternative embodiment according to various embodiments of the present invention.

Turning to FIG. 12, a diagram is provided of an embodiment of a configuration in which a designated area 1210 is being monitored by multiple monitoring components 1215, 1220. In this instance, the multiple monitoring components 1215, 1220 are monitoring to determine whether it is safe or not for a vehicle 1225 to pass another vehicle 1230 by travelling in a lane 1235 being used by oncoming traffic. The first monitoring component 1215 monitors the landscape in the designated area 1210 to detect whether any obstruction is within the designated area 1210 (such as a vehicle travelling in the lane 1235 as oncoming traffic) and signals to the second monitoring component 1220 accordingly. Further, the second monitoring component 1220 also monitors the landscape in the designated area 1210 to detect whether any obstruction is within the designated area 1210. Based on the information received from the first monitoring component 1215 and information it 1220 has gathered, the second monitoring component 1220 signals the vehicle 1225 as to whether it is safe or not to pass another vehicle 1230 by travelling in the lane 1235 being used by oncoming traffic. In particular instances, the first monitoring component 1215 may be carrying out the same functionality by signaling vehicles travelling in the lane 1235 for oncoming traffic whether or not it is save to pass a vehicle by travelling in the opposite lane 1240 carrying oncoming traffic based on monitoring being conducted by the second monitoring component 1220 and itself 1215.

Exemplary System Operation

The logical operations described herein may be implemented (1) as a sequence of computer implemented acts or one or more program modules running on a computer processing component and/or (2) as interconnected machine logic circuits or circuit modules within the computer processing component. The implementation is a matter of choice dependent on the performance and other requirements of the computer processing component. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Object Recognition Device Module

Figure 13:
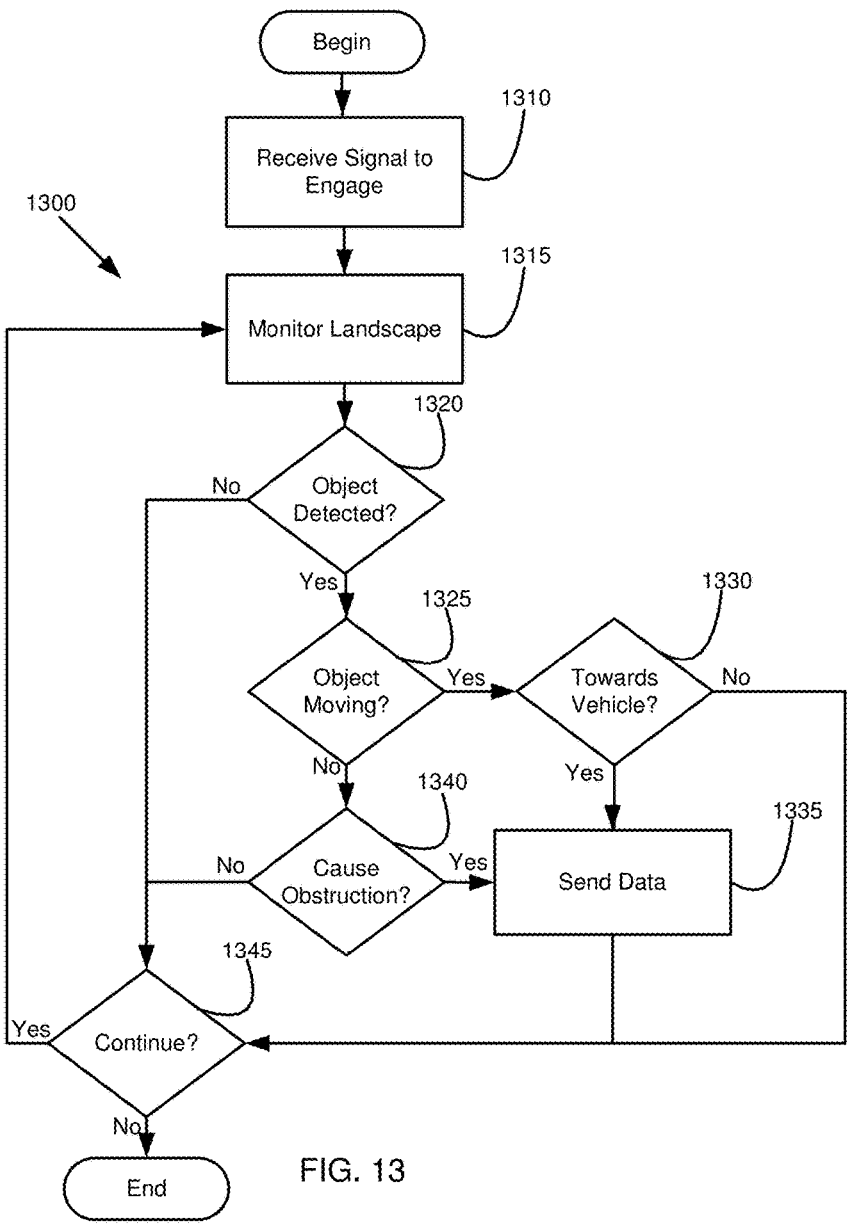
FIG. 13 is a flowchart illustrating an object recognition device module that can be used in accordance with various embodiments of the present invention.

Turning now to FIG. 13, details are provided regarding a process flow for monitoring at least a portion of a landscape surrounding an object such as a vehicle or a landscape in a designated area and sending data based on such monitoring. In particular, FIG. 13 is a flow diagram showing an object recognition device module for performing such functionality according to one embodiment of the invention. For example, the flow diagram shown in FIG. 13 may correspond to operations carried out by an object recognition device attached to the exterior of some stationary or mobile object, as it executes the object recognition device module stored in the device's volatile and/or nonvolatile memory.

Beginning with Operation 1310, the process 1300 begins with the object recognition device module receiving a signal to engage and begin monitoring a landscape surrounding at least a portion of an object or a landscape in a designated area. As previously mentioned, such a signal may be received in particular embodiments from a processing component as a result of an engage switch being placed in the "ON" position. Upon receiving the signal, the object recognition device module begins monitoring the landscape in Operation 1315. Depending on the embodiment, the object recognition device may be a radar device, a camera, a heat detection device, GPS device, or some other device that may use remote sensing such as a satellite. Accordingly, the object recognition device module gathers data from the device on the landscape surrounding the vehicle or in the designated area to detect objects present in the landscape and within range of being detected.

As data is being gathered, the object recognition device module determines whether an object had been detected in Operation 1320. If not, then the object recognition device module determines whether to continue to monitor the landscape in Operation 1335. For instance, in particular embodiments, the object recognition device module may receive a signal from the processing component as a result of the engage switch being placed in the "OFF" position and/or the module may receive an indication that the power to the objection recognition device has been turned off or lost. If such a signal is received and the module determines not to continue to monitor the landscape, then the process 1300 ends. However, if the object recognition device module determines to continue to monitor the landscape, then the module returns to Operation 1315 and continues to monitor the landscape.

Returning to Operation 1320, if instead the object recognition device module does determine an object has been detected then the object recognition device module in this particular embodiment determines whether the object is moving in Operation 1325. That is to say, the object recognition device module determines whether the object is actually moving or is merely a stationary object that has moved within range of being detected due to movement of the object (e.g., vehicle) to which the object recognition device is attached. Accordingly, if the object recognition device module determines the object is moving, then the module in this particular embodiment determines whether the object is moving towards the object (e.g., vehicle) in Operation 1330. That is to say, the object recognition device module determines in particular instances whether the object is moving/traveling towards the vehicle and thus may become hazardous to surrounding vehicles attempting to move around the vehicle. If the object is moving, then the object recognition device module sends data on the object to the processing component in Operation 1335.

However, returning to operation 1325, if the object recognition device instead determines the object is not moving then the module determines whether the object may still cause an obstruction in Operation 1340. For instance, although the detected object may not be another vehicle moving towards the object (e.g., vehicle) to which the object recognition device is attached, the object may still be some stationary object in the roadway that may pose a hazard to neighboring vehicles such as a median in the roadway that a neighboring vehicle could possibly hit while attempting to pass the object. Therefore, in this particular embodiment, the object recognition device is configured to determine whether a stationary object poses such a hazard as opposed to some object that is not such as, for example, an object safely on the side of the roadway such as a tree, a mailbox, and/or a light post. If the object recognition device determines the object may cause such an obstruction, then the module sends data on the object to the processing component in Operation 1335.

At this point, the object recognition device module determines whether to continue to monitor the landscape in Operation 1335. If so, then the module returns to Operation 1315 and continues to monitor the landscape. This process 1300 continues until the object recognition device module determines that the monitoring is no longer needed and the process 1300 ends.

Processing Component Module

Figure 14:
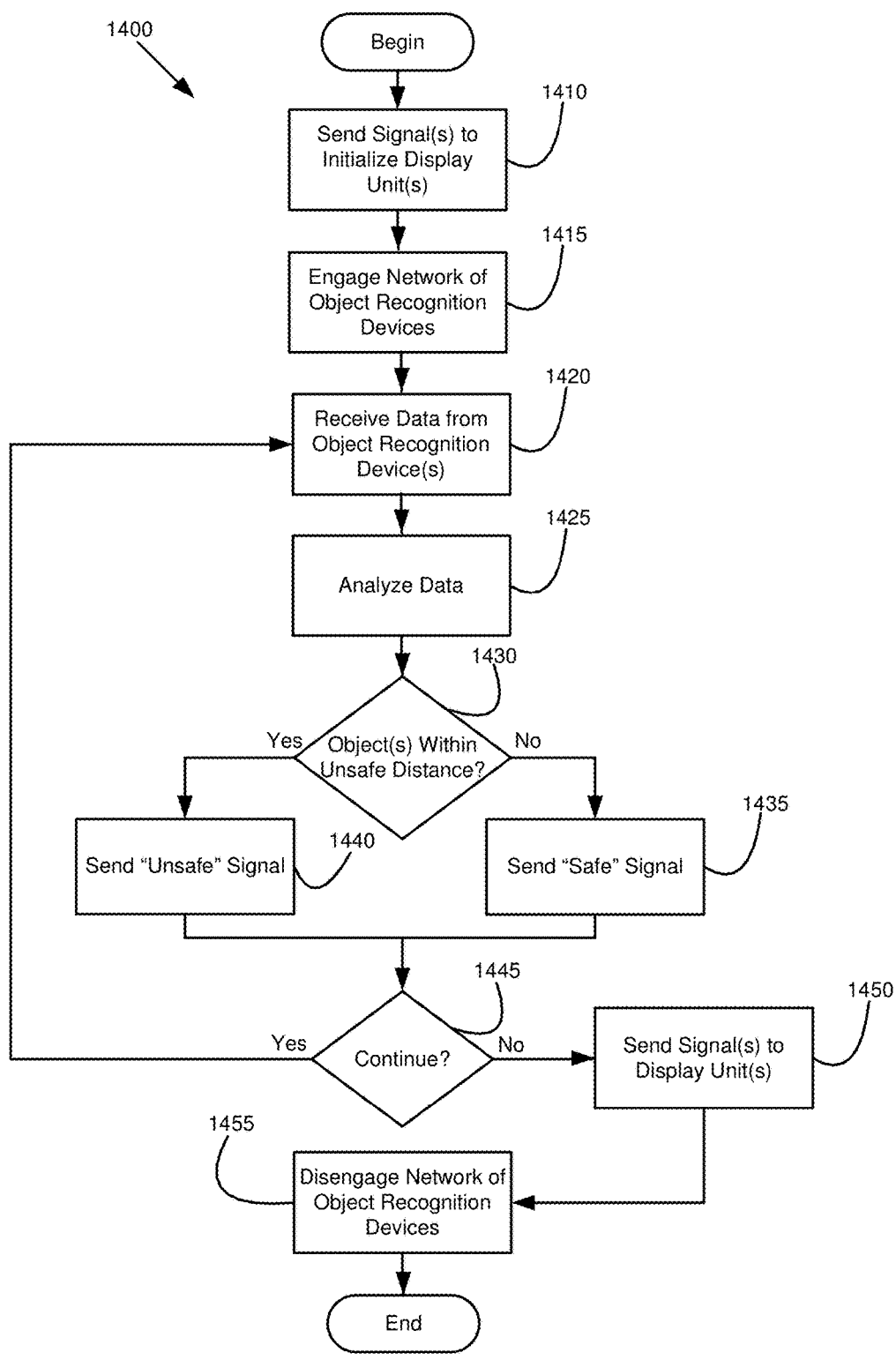
FIG. 14 is a flowchart illustrating a processing component module that can be used in accordance with various embodiments of the present invention.

Turning now to FIG. 14, details are provided regarding a process flow for receiving data on at least a portion of a landscape surrounding an object such as a vehicle or a landscape in a designated area and sending signals to one or more display units based on the data. In particular, FIG. 14 is a flow diagram showing a processing component module for performing such functionality according to one embodiment of the invention. For example, the flow diagram shown in FIG. 14 may correspond to operations carried out by a processing component installed on a stationary or mobile object, as it executes the processing component module stored in the component's volatile and/or nonvolatile memory.

Once started, the process 1400 begins with the processing component module sending one or more signals to one or more display units to initialize the display units in Operation 1410. For instance, in one embodiment, the signals initialize the display units to display a message indicating that it is currently unsafe to pass the object (e.g., vehicle) or pass through the designated area. While in another embodiment, the signals initialize the display units to display a more neutral message indicating that neighboring vehicles should pass the vehicle or through the designated area with extreme caution. Thus, in these instances, the message displayed acts as a default until at least a portion of the landscape surrounding the object or landscape in the designated area can be monitored and analyzed. Those of ordinary skill in the art can envision other default messages that may be used in light of this disclosure.

Continuing on, the processing component module engages the network of object recognition devices used to monitor at least a portion of the landscape surrounding the object (e.g., vehicle) or in the designated area in Operation 1415. Accordingly, in various embodiments, the processing component module sends a signal to each object recognition device to begin monitoring and providing data on the landscape. In turn, the object recognition devices begin to monitor the landscape and send data back on the landscape to the processing component module. Thus, in Operation 1420, the processing component module receives the data on the landscape from one or more object recognition devices.

At this point, the processing component module analyzes the data in Operation 1425 to identify any other objects (e.g., other vehicles and/or pedestrians) detected within the landscape surrounding the object (e.g., vehicle) or in the designated area. Accordingly, in Operation 1430, the processing component module determines whether any other objects are within an unsafe distance from the object or serve as an obstruction in the designated area. For instance, in particular embodiments involving detecting objects surrounding a vehicle, the processing component module may determine whether any object is within a threshold distance from the vehicle such as, for example, four hundred yards. Depending on the embodiment, this threshold distance may be static or dynamic based on other factors with respect to a detected object. For example, the threshold distance may be a dynamic distance based on the velocity of the detected object and the threshold distance is set based on whether the object is moving at a rate: between zero and twenty-five mph, then the threshold distance is set at four hundred yards; between twenty-five and fifty mph, then the threshold distance is set at four hundred and fifty yards; and greater than fifty mph, then the threshold distance is set at five hundred yards. Other factors may be considered in determining whether an object is within an unsafe distance in other embodiments such as, for example, the acceleration of the object, the size of the object, and/or the type of object (e.g., a car, a truck, a scooter, a bicycle, a pedestrian, etc.).

In addition, although not shown in FIG. 14, the processing component module in various embodiments may be configured to perform one or more of the operations described above with respect to the object recognition device module such as, for example, determining whether an object is detected in the data, determining whether a detected object is moving and if so, whether the object is moving towards the object (e.g., vehicle) or into the designated area, and/or determining whether a detected stationary object may cause an obstruction. Thus, in these particular embodiments, the object recognition device module may be simply configured to periodically collect and send data on the landscape to the processing component module.

With that said, one or more of the operations shown in FIG. 14 may be performed by the object recognition device module instead of the processing component module in various embodiments. For instance, in particular embodiments, the object recognition device module may be configured to analyze the data to determine whether a detected object is or is not within an unsafe distance from the object (e.g., vehicle) or does or does not serve as an obstruction in the designated area and sends data to the processing component module accordingly. Thus, those of ordinary skill in the art should understand that the embodiments of the object recognition device module and the processing component module shown in FIGS. 13 and 14 are not the only embodiments of these modules contemplated by the inventor and that various operations shown for these embodiments may be performed by other modules, combined and performed by a single module, and/or not performed at all.

At this point, if the processing component module determines no object is within an unsafe distance from the object (e.g., vehicle) or serves as an obstruction in the designated area, then the processing component module sends one or more signals to the one or more display units indicating such in Operation 1435. In turn, the display units display a message to, for example, neighboring vehicles that it is safe to pass the vehicle or proceed through the designated area. However, if the processing component module determines an object is within an unsafe distance from the object (e.g., vehicle) or serves as an obstruction in the designated area, then the processing component module sends one or more signals to the one or more display units indicating such in Operation 1440. Accordingly, the display units then display a message, for example, to neighboring vehicles that it is unsafe to pass the vehicle or to proceed through the designated area.

Once the signals have been sent to the display units, the processing component module determines whether to continue the process 1400 in Operation 1445. For instance, in particular embodiments, the processing component module determines whether the engage switch has been placed in the "OFF" position and/or whether power is no longer being supplied to the processing components. If so, then the processing component module sends signals to the display units to indicate monitoring has ceased in Operation 1450 and disengages the network of object recognition devices in Operation 1455. Otherwise, if the processing component module determines that the process 1400 should continue, then the processing component module returns to Operation 1420 to receive more data from the object recognition devices.

Display Unit Module

Figure 15:
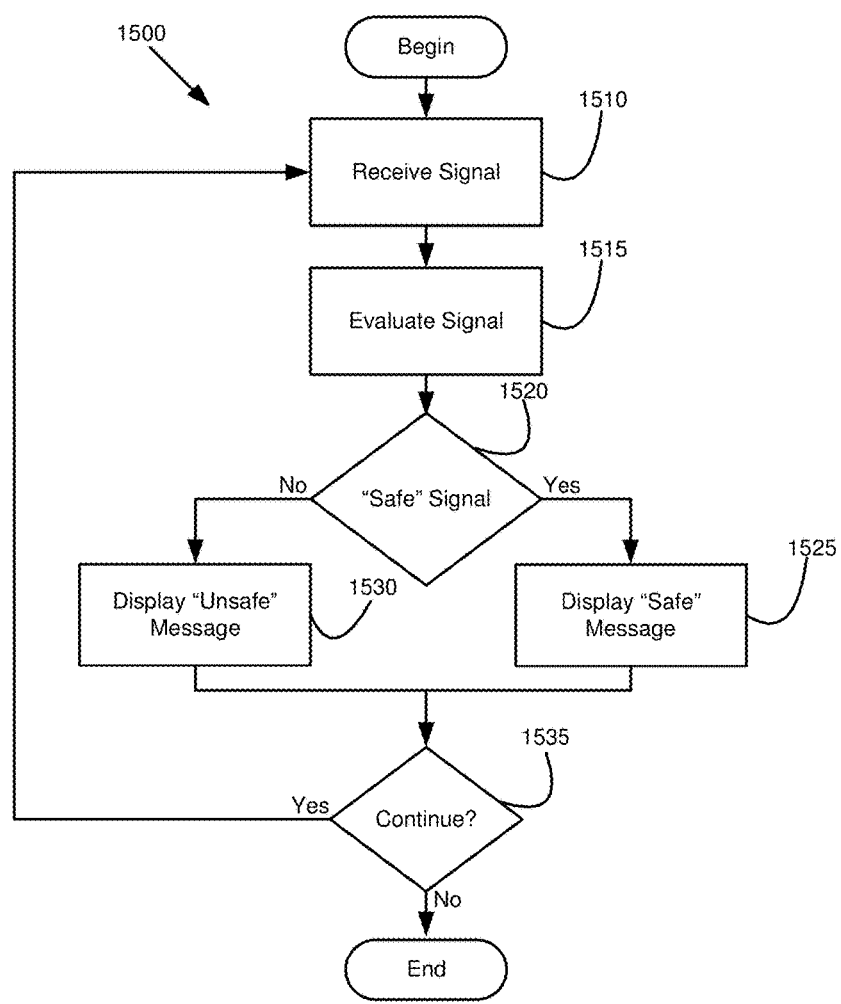
FIG. 15 is a flowchart illustrating a display unit module that can be used in accordance with various embodiments of the present invention.

Turning now to FIG. 15, details are provided regarding a process flow displaying messages based on data received on at least a portion of a landscape surrounding an object such as a vehicle or a landscape in a designated area. In particular, FIG. 15 is a flow diagram showing a display unit module for performing such functionality according to one embodiment of the invention. For example, the flow diagram shown in FIG. 15 may correspond to operations carried out by a display unit installed on a stationary or mobile object, as it executes the display unit module stored in the unit's volatile and/or nonvolatile memory.

Accordingly, the process 1500 begins with the display unit module receiving a signal from the processing component in Operation 1510. In various embodiments, this signal includes information indicating what type of message should be displayed by the display unit. For instance, the signal may indicate to display a message warning neighboring objects (e.g., vehicles and/or pedestrians) that it is not safe to pass the object (e.g., vehicle) or to proceed through the designated area or to display a message advising the neighboring objects that it is safe to pass the object or to proceed through the designated area. Depending on the embodiment, the signal may indicate to display other messages such as, for instance, a default message that advises neighboring objects to pass the object or proceed through the designated area with extreme caution. Such a message may be displayed as an initial default message when monitoring of the landscape begins and an initial analysis of the landscape has not yet been performed.

Continuing on, in Operation 1515, the display unit module evaluates the signal to determine which message should be displayed on the unit. Therefore, for the embodiment shown in FIG. 15, the display unit module determines whether a signal has been received indicating that a message advising neighboring objects (e.g., vehicles and/or pedestrians) that it is safe to pass the object (e.g., vehicle) or proceed through the designated area should be displayed in Operation 1520. If so, then the display unit module displays a message advising neighboring objects that it is safe to pass the object or proceed through the designated area in Operation 1525. If not, then the display unit module displays a message advising neighboring objects that it is not safe to pass the object or proceed through the designated area in Operation 1530.

It is noted that depending on the types of messages that may be displayed by the display unit in various embodiments, the display unit module may make different or additional determinations than the determination shown as Operation 1520 in FIG. 15 as to what message should be displayed on the unit. For instance, in particular embodiments, the display unit may also display a default message when monitoring at least a portion of a landscape surrounding an object (e.g., vehicle) or a landscape in a designated area begins such as advising neighboring objects (e.g., vehicles and/or pedestrians) to pass the object or proceed through the designated area with extreme caution. Thus, in these particular embodiments, the process 1500 shown in FIG. 15 for the display module would also include a determination operation to determine whether or not to display the default message in addition to the determination Operation 1520 to determine whether or not to display the message indicating that it is safe to pass the object or proceed through the designated area. Accordingly, those of ordinary skill in the art can envision other messages that may be displayed by the display unit and corresponding determination operations that may performed by the display unit module in light of this disclosure.

Finally, the display unit module determines whether to continue the process 1500 in Operation 1535. For instance, in particular embodiments, the display unit module determines whether the engage switch has been placed in the "OFF" position and/or whether power is no longer being supplied to the display unit. If so, then the display unit module ends the process 1500. Otherwise, if the display unit module determines that the process 1500 should continue, then the display unit module returns to Operation 1510 to wait to receive a signal from the processing component.

Exemplary Computer Processing Device

Figure 16:
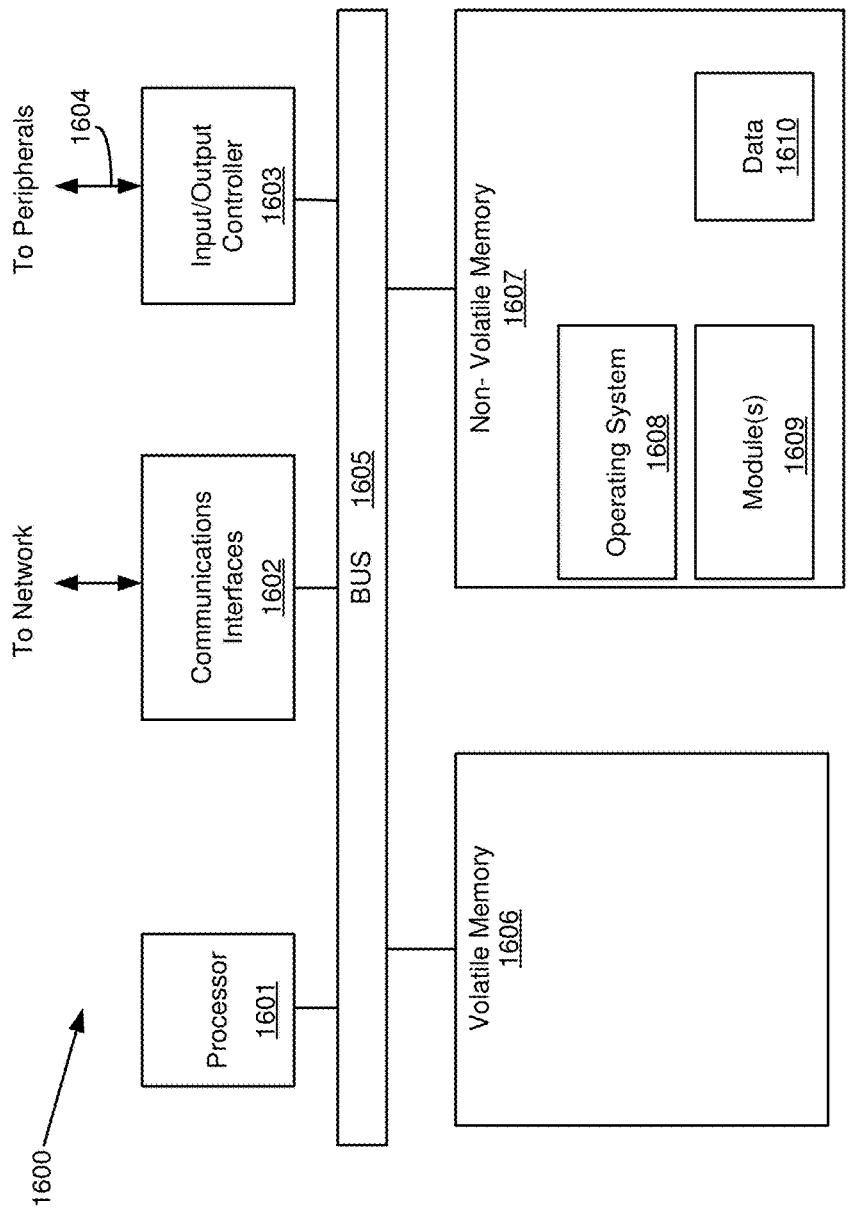
FIG. 16 is an exemplary schematic diagram of an embodiment of a component used to practice the technologies disclosed herein.

FIG. 16 is an exemplary schematic diagram of a processing component or device 1500 that may be used in various embodiments of architectures to practice the technologies disclosed herein such as, for example, a processing component, an object recognition device, or a display unit previously described. In general, a "processing component or device" may be exemplified by, for example, but without limitation: a computer, server, tablet device, smart device, notebook, laptop, blade, gateway, switch, and the like, as well as any combination of components or devices adapted to perform the functions described herein.

As shown in FIG. 16, the processing component or device 1600 may include one or more processors 1601 that may communicate with other elements within the component or device 1600 via a bus 1605. The processor(s) 1601 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In particular embodiments, the component or device 1600 may also include one or more communications interfaces 1602 for communicating data with various external components or devices. Accordingly, communication may be via wired, optical, wireless, cellular, or a combination thereof. Thus, depending on the configuration, the communication may use a variety of data transmission protocols such as, for example, fiber distributed data interface (FDDI), Ethernet, asynchronous transfer mode ("ATM"), or frame relay.

The processing component or device 1600 may also include an input/output controller 1603 that may communicate with one or more input devices or peripherals such as, but not limited to: a keyboard, a mouse, a touch screen/display, microphone, pointing device, etc. The input/output controller 1603 may also communicate with one or more output devices or peripherals such as, but not limited to: a screen display, printer, speaker, headset, banner displays, etc.

The processor(s) 1601 may be configured to execute instructions stored in volatile memory 1606, non-volatile memory 1607, or other forms of computer-readable storage media accessible to the processor(s) 1601. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1607 may store program code and data, which also may be loaded into the volatile memory 1606 at execution time. For example, the non-volatile memory 2207 may store one or more modules 1609 that may perform the above-mentioned process flows and/or operating system code 1608 containing instructions for performing the process and/or functions associated with the technologies disclosed herein. The module(s) 1609 may also access, generate, or store related data 1610, including, for example, the data described above in conjunction with monitoring at least a portion of a landscape surrounding a vehicle, in the non-volatile memory 1607, as well as in the volatile memory 1606. The volatile memory 1606 and/or non-volatile memory 1607 may be used to store other information including, but not limited to: records, applications, programs, scripts, source code, object code, byte code, compiled code, interpreted code, machine code, executable instructions, or the like. These may be executed or processed by, for example, the processor(s) 1601 and may form a part of, or may interact with, the module(s) 1609.

The technologies described herein may be implemented in various ways, including as computer program products comprising memory storing instructions causing a processor to perform the operations associated with the above technologies. The computer program product may comprise a non-transitory (tangible), computer-readable medium storing applications, programs, program modules, scripts, source code, program code, object code, byte code, compiled code, interpreted code, machine code, executable instructions, and/or the like (also referred to herein as computer-readable instructions, executable instructions, instructions for execution, program code, and/or similar terms). Such non-transitory, computer-readable media include all the above identified computer-readable media (including volatile and non-volatile media), but does not include a transitory, propagating signal, nor does it encompass a non-tangible, computer-readable medium. Non-volatile computer-readable medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

Further, it should be understood that although the primarily use of various embodiments of the invention described herein are with respect to signaling neighboring vehicles about whether or not it is safe to pass a vehicle that may be stopped or impeding traffic or signaling vehicles proceeding through a designated area, such use is not the only use contemplated. For instance, various embodiments may be used in other applications such as, for example, simply signaling neighboring vehicles following a vehicle that the vehicle is slowing and planning to stop within a certain distance. While other embodiments of the invention may be used for signaling pedestrians at a crosswalk and/or students leaving a school bus as to whether or not it is safe to walk in front of a stopped vehicle/school bus to cross a road. Thus, those of ordinary skill in the art should understand that numerous uses of various embodiments of the invention are contemplated and within this scope of this invention.

The invention claimed is:

1. A method comprising the steps of:
monitoring at least a portion of a landscape surrounding a vehicle using one or more devices mounted to the vehicle and configured to detect objects within the portion of the landscape;
detecting an object within the portion of the landscape by at least one of the one or more devices;
determining by a processing component a threshold distance based on a velocity of the detected object;
determining by the processing component whether the detected object is within the threshold distance from the vehicle; and
displaying a message that can be viewed by a second vehicle upon determining the detected object is within the threshold distance from the vehicle, wherein the message conveys to the second vehicle not to move through the portion of the landscape surrounding the vehicle in order for the second vehicle to avoid hitting the detected object.

2. The method of claim 1 further comprising the step of:
displaying a second message that can be viewed by the second vehicle upon determining the detected object is not within the threshold distance from the vehicle, wherein the second message conveys to the second vehicle that the second vehicle is safe to move through the portion of the landscape surrounding the vehicle.

3. The method of claim 1, wherein the one or more devices comprise at least one of a camera, a radar detection device, a spectrometer, and a heat detection device.

4. A non-transitory, computer-readable medium comprising computer-readable instructions that when executed by a computer processor cause the computer processor to:
receive data from at least one device mounted to a vehicle and configured to monitor at least a portion of a landscape surrounding the vehicle to detect objects within the portion of the landscape, the at least device detecting an object within the portion of the landscape;
determine a velocity of the detected object from the data;
determine a threshold distance based on the velocity of the detected object;
determine whether the detected object is within the threshold distance from the vehicle; and
send a signal to one or more display units indicating to the one or more display units to display a message that can be viewed by a second vehicle upon determining the detected object is within the threshold distance from the vehicle, wherein the message conveys to the second vehicle not to move through the portion of the landscape surrounding the vehicle in order for the second vehicle to avoid hitting the detected object.

5. The non-transitory, computer-readable medium of claim 4, wherein the computer-readable instructions when executed by the computer processor further cause the computer processor to:
send a second signal to the one or more display units indicating to the one or more display units to display a second message that can be viewed by the second vehicle upon determining the detected object is not within the threshold distance from the vehicle, the second message conveying to the second vehicle that the second vehicle is safe to move through the portion of the landscape surrounding the vehicle.

6. The non-transitory, computer-readable medium of claim 4, wherein the computer processor is located within the interior of the vehicle.

7. The non-transitory, computer-readable medium of claim 4, wherein the at least one device comprises at least one of a camera, a radar detection device, a spectrometer, and a heat detection device.

8. A system comprising:
a device mounted to a vehicle and configured to:
monitor at least a portion of a landscape surrounding the vehicle to detect objects within the portion of the landscape;
detect an object within the portion of the landscape; and
send data on detecting the object;
a processing component mounted to the vehicle and configured to:
receive the data from the device;
determine a velocity of the detected object from the data;

determine a threshold distance based on the velocity of the detected object;

determine whether the detected object is within the threshold distance from the vehicle; and send a signal upon determining the detected object is within the threshold distance from the vehicle; and a display unit mounted to the vehicle and configured to:

receive the signal; and display a message that can be viewed by a second vehicle based on receiving the signal, wherein the message conveys to the second vehicle not to move through the portion of the landscape surrounding the vehicle in order for the second vehicle to avoid hitting the detected object.

9. The system of claim 8, wherein:

The processing component is further configured to:

send a second signal upon determining the object is not within the threshold distance from the vehicle; and the display unit is further configured to:

receive the second signal; and display a second message that can be viewed by the second vehicle based on receiving the second signal, wherein the second message conveys to the second vehicle that the second vehicle is safe to move through the portion of the landscape surrounding the vehicle.

10. The system of claim 8 further comprising a power supply mounted to the vehicle configured to power the objection recognition device, the processing component, and the display unit.

11. The system of claim 8, wherein the device comprises at least one of a camera, a radar detection device, a spectrometer, and a heat detection device.

12. The method of claim 1 further comprising the step of sending data on the detected object by the at least one of the one or more devices to the processing component in response to at least one of a time interval elapsing and detection of the object moving through the portion of the landscape surrounding the vehicle.

13. The method of claim 1, wherein the monitoring of the portion of the landscape surrounding the vehicle is performed in response to the vehicle stopping for a set amount of time.

14. The method of claim 1 further comprising the step of displaying a third message that can be viewed by the second vehicle prior to detecting the object, wherein the third message conveys to the second vehicle to move through the portion of the landscape surrounding the vehicle with caution.

15. The non-transitory, computer-readable medium of claim 4, wherein the data is received from at least one device in response to at least one of a time interval elapsing and the at least one objection recognition device detecting the object moving through the portion of the landscape surrounding the vehicle.

16. The non-transitory, computer-readable medium of claim 4, wherein the at least one device monitors the portion of the landscape surrounding the vehicle in response to the vehicle stopping for a set amount of time.

17. The non-transitory, computer-readable medium of claim 4, wherein the computer-readable instructions when executed by the computer processor further cause the computer processor to send a third signal to the one or more display units indicating to the one or more display units to display a third message that can be viewed by the second vehicle prior to receiving the data from the at least one device, the third message conveying to the second vehicle to move through the portion of the landscape surrounding the vehicle with caution.

18. The system of claim 8, wherein the data is sent by the device in response to at least one of a time interval elapsing and detecting the object moving through the portion of the landscape surrounding the vehicle.

19. The system of claim 8, wherein the device is configured to monitor of the portion of the landscape surrounding the vehicle in response to the vehicle stopping for a set amount of time.

20. The system of claim 8, wherein the display unit is further configured to display a third message that can be viewed by the second vehicle prior to receiving the signal from the processing unit, the third message conveying to the second vehicle to move through the portion of the landscape surrounding the vehicle with caution.

* * * * *